(12) United States Patent
Abdel Shahid et al.

(10) Patent No.: US 11,678,319 B2
(45) Date of Patent: **\*Jun. 13, 2023**

(54) DYNAMIC ALLOCATION OF TRANSMISSION SLOTS BASED ON UE INFORMATION

(71) Applicant: T-Mobile USA, Inc., Bellevue, WA (US)

(72) Inventors: Wafik Abdel Shahid, Kenmore, WA (US); Ming Shan Kwok, Seattle, WA (US)

(73) Assignee: T-Mobile USA, Inc., Bellevue, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 17/482,277

(22) Filed: Sep. 22, 2021

(65) Prior Publication Data

US 2022/0022202 A1 Jan. 20, 2022

Related U.S. Application Data

(63) Continuation of application No. 16/696,509, filed on Nov. 26, 2019, now Pat. No. 11,134,503.

(51) Int. Cl.
*H04W 72/12* (2023.01)
*H04L 5/00* (2006.01)
*H04W 72/0446* (2023.01)
*H04W 24/02* (2009.01)
*H04W 72/23* (2023.01)

(52) U.S. Cl.
CPC .......... *H04W 72/12* (2013.01); *H04L 5/0037* (2013.01); *H04L 5/0053* (2013.01); *H04W 24/02* (2013.01); *H04W 72/0446* (2013.01); *H04W 72/23* (2023.01)

(58) Field of Classification Search
CPC ... H04W 72/12; H04W 24/02; H04W 72/042; H04W 72/0446; H04L 5/0037; H04L 5/0053

See application file for complete search history.

(56) References Cited

U.S. PATENT DOCUMENTS 9,031,560 B2 \* 5/2015 Anantha ........... H04W 36/0055
455/437
9,992,720 B2 \* 6/2018 Amirijoo .......... H04W 36/0061
(Continued)

OTHER PUBLICATIONS

Office Action for U.S. Appl. No. 16/696,509, dated Mar. 30, 2021, Shahid, "Dynamic Allocation of Transmission Slots Based on UE Information", 9 Pages.

*Primary Examiner* — Diane L Lo
*Assistant Examiner* — Abusayeed M Haque
(74) *Attorney, Agent, or Firm* — Lee & Hayes, P.C.

(57) ABSTRACT

A radio access network (RAN) configured to provide allocations of transmission slots to user equipment (UEs) is described herein. The RAN may receive indicia about RAN conditions or about UEs in a vicinity of the RAN. Responsive to receiving the indicia, the RAN may determine, based at least in part on the indicia, a first allocation of uplink and downlink transmission slots to a first UE and a second allocation of uplink and downlink transmission slots to a second UE. The first allocation may differ from the second allocation. The RAN may then provide the first allocation to the first UE and the second allocation to the second UE.

20 Claims, 5 Drawing Sheets

(56) References Cited

U.S. PATENT DOCUMENTS

| | | | |
|---|---|---|---|
| 2008/0132268 A1* | 6/2008 | Choi-Grogan | H04W 28/24 455/550.1 |
| 2010/0080125 A1* | 4/2010 | Olsson | H04W 72/23 370/235 |
| 2014/0269364 A1* | 9/2014 | Knapp | H04L 41/083 370/252 |
| 2015/0382224 A1* | 12/2015 | Himayat | H04L 65/80 370/332 |
| 2016/0100401 A1* | 4/2016 | Xiong | H04W 76/19 455/450 |
| 2016/0254889 A1* | 9/2016 | Shattil | H04L 27/2636 370/329 |
| 2018/0176710 A1* | 6/2018 | Jang | H04W 88/10 |
| 2018/0375597 A1* | 12/2018 | Sur | H04B 7/0452 |
| 2019/0159146 A1* | 5/2019 | Sun | H04W 56/001 |
| 2020/0266920 A1* | 8/2020 | Nammi | H04L 5/005 |
| 2020/0389868 A1* | 12/2020 | Martin | H04W 72/23 |
| 2021/0037375 A1* | 2/2021 | Cakulev | H04W 8/186 |
| 2021/0076424 A1* | 3/2021 | Mukherjee | H04W 16/14 |
| 2021/0160895 A1 | 5/2021 | Abdel Shahid et al. | |
| 2021/0409168 A1* | 12/2021 | Dang | H04L 1/1671 |

\* cited by examiner

DYNAMIC ALLOCATION OF TRANSMISSION SLOTS BASED ON UE INFORMATION

RELATED APPLICATIONS

This application is a continuation of and claims priority to U.S. patent application Ser. No. 16/696,509, filed on Nov. 26, 2019, titled, "DYNAMIC ALLOCATION OF TRANSMISSION SLOTS BASED ON UE INFORMATION," the entirety of which is incorporated herein by reference.

BACKGROUND

Allocation of time slots for uplink transmission and downlink transmission (referred to herein as "transmission slots") typically follows standardized ratios of downlink to uplink. For example, three downlink slots may be allocated for every one uplink slot. While standards allow for varying allocation at radio access networks (RANs), in practice allocation is the same at each RAN. This is to ensure that different carriers who are sharing a spectrum band do not utilize the spectrum in a conflicting manner.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

A RAN configured to provide allocations of transmission slots to UEs is described herein. The RAN may receive from UEs indicia about RAN conditions or about UEs in a vicinity of the RAN. Responsive to receiving the indicia, the RAN may determine, based at least in part on the indicia, a first allocation of uplink and downlink transmission slots to a first UE and a second allocation of uplink and downlink transmission slots to a second UE. The first allocation may differ from the second allocation. The RAN may then provide the first allocation to the first UE and the second allocation to the second UE.

In various implementations, a UE as described above may be configured to send a first request for a first allocation of uplink transmission slots and downlink transmission slots from the RAN. The request may include indicia about RAN conditions or about the UE. The UE may then receive, in response, the first allocation of uplink transmission slots and downlink transmission slots from the RAN. At a subsequent time, the UE may change its location or change the application that is currently active. The UE may determine the occurrence of such a change and, in response, request from the RAN a second allocation of uplink transmission slots and downlink transmission slots. The RAN may then provide the allocation. In some implementations, the first allocation may differ from the second allocation.

Overview

Figure 1:
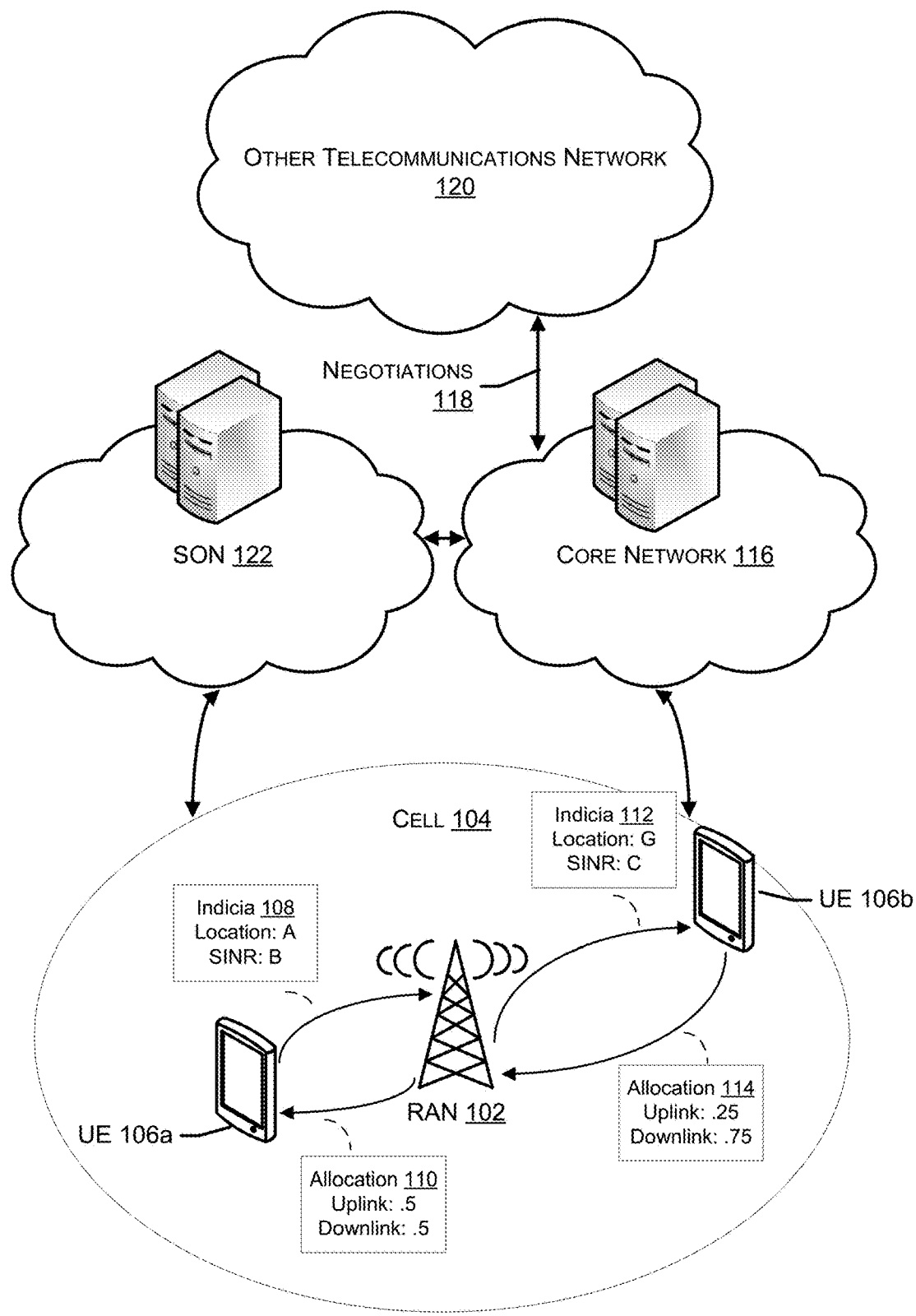
FIG. 1 illustrates an example overview of a RAN configured to provide allocations of transmission slots to user equipment (UEs) based at least in part on RAN conditions and/or indicia about the UEs.

FIG. 1 illustrates an example overview of a RAN configured to provide allocations of transmission slots to UEs based at least in part on RAN conditions and/or indicia about the UEs. As illustrated in FIG. 1, a RAN 102 having a cell 104 may be connected to multiple UEs 106 located within the cell 104. A first UE 106*a* may provide indicia 108 to the RAN 102, and a second UE 106*b* may provide indicia 112 to the RAN 102. When referring to either of UEs 106*a* or 106*b*, or to an instance of other UEs 106, reference is made herein to a "UE 106." In response to receiving indicia 108 and 112, the RAN 102 may provide an allocation 110 of transmission slots to the first UE 106*a* and an allocation 114 of transmission slots to the second UE 106*b*. Before providing the allocations 110 and 114, the RAN 102 may communicate with a core network service 116 which negotiates 118 with another telecommunication network 120 to coordinate allocation of transmission slots. Any changes to allocation patterns based on the negotiations 118 may be provided to the RAN 102 via a self-optimizing network (SON) 122.

In various implementations, RAN 102 may be one of a number of access networks of a telecommunications service provider. The telecommunications service provider may operate a telecommunications network that includes access networks, such as RAN 102, a core network, such as core network 116, and a management plane, such as SON 122. The telecommunications service provider may have licenses to bands of radio frequency spectrum and the RANs may provide wireless coverage via different parts of the licensed frequency bands. The coverage provided by each RAN may vary based on the technology of that RAN. For example, a Fourth Generation (4G) RAN may provide access via one set of frequency bands and a Fifth Generation (5G) RAN may provide access via a different or overlapping set of frequency bands.

RANs of the telecommunications network, such as RAN 102, may utilize any Third Generation Partnership Project (3GPP) Standard Third Generation (3G), 4G, 5G, etc. technology or other 3G, 4G, 5G, etc. technology. Alternatively or additionally, example RANs, such as RAN 102, may utilize unlicensed wireless networks, such as WiFi® or WiMax® networks, and/or wired access networks.

As illustrated in FIG. 1, the RAN 102 may include a cell tower; one or more base station units coupled to the cell tower, offering connectivity to cell 104, and using one or more technology types; one or more power sources; and mechanisms for connecting the base station unit(s) to the core network 116. For example, the RAN 102 may include an eNode B (eNB) base station for supporting an LTE connection, a gNode B (gNB) base station for supporting a NR connection, or both. The eNB and gNB may be implemented in a single computing device or through multiple computing devices and may represent an ENDC (E-UTRAN (Evolved UMTS (Universal Mobile Telecommunications Service) Terrestrial Radio Access Network) New Radio— Dual Connectivity) solution. The ENDC solution enables the UEs 106 to connect to the eNB through an LTE connection, with the eNB serving as a master node, and to the gNB through a NR connection, with the gNB serving as a secondary node. ENDC solutions are specified in greater detail by 3GPP standards.

Figure 4:
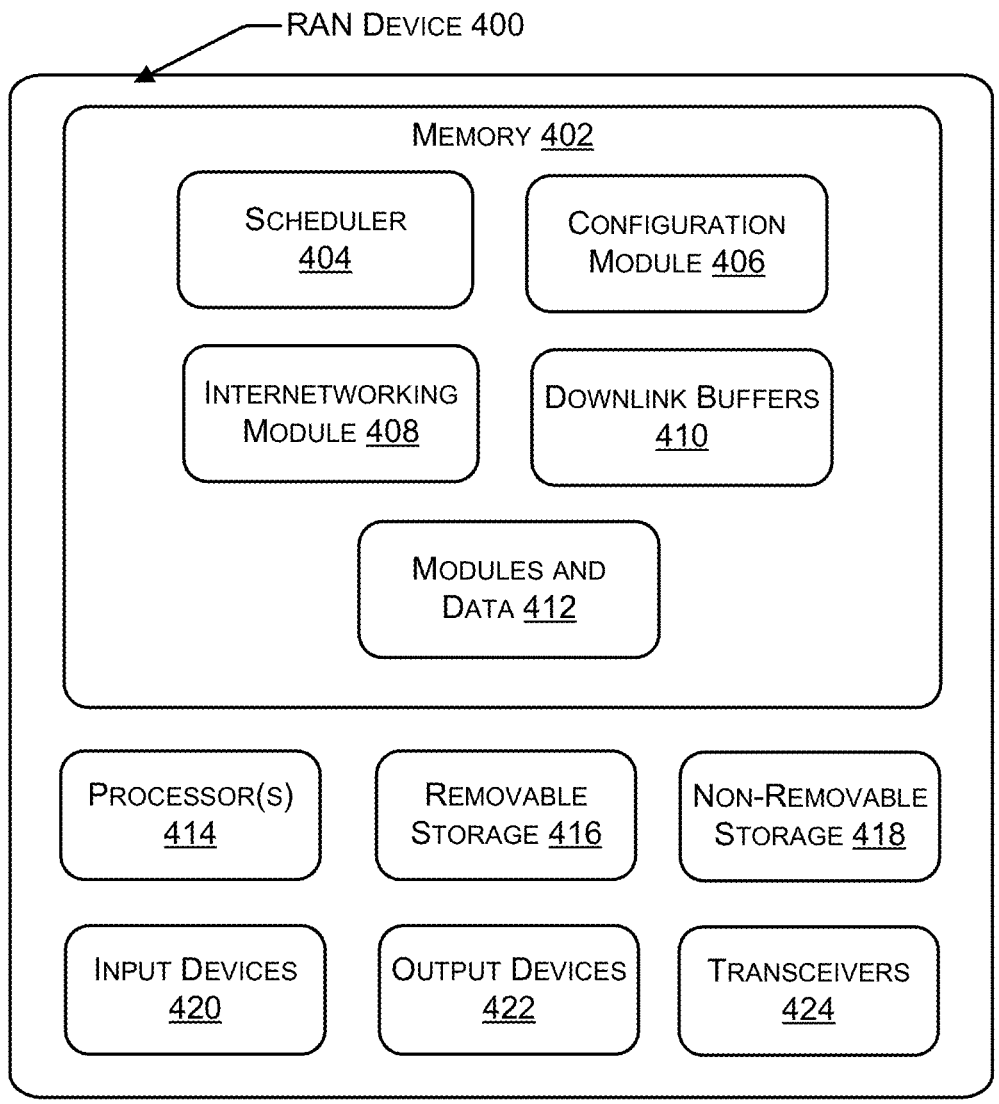
FIG. 4 illustrates an example architecture of a computing device of a RAN configured to receive indicia from UEs and to provide, in return, an allocation of transmission slots to the UEs.

RAN 102 may also include a scheduler to allocate time slots for frequency bands, as well as downlink buffers, a configuration module, and an internetwork module. An example computing device configured to implement the RAN 102 is illustrated in FIG. 4 and described further herein with reference to that figure.

In some implementations, cell 104 may correspond to a single geographic area in which the RAN 102 provides coverage. In other implementations, cell 104 may correspond to multiple, overlapping geographic area in which multiple base stations of RAN 102 provide coverage.

Figure 5:
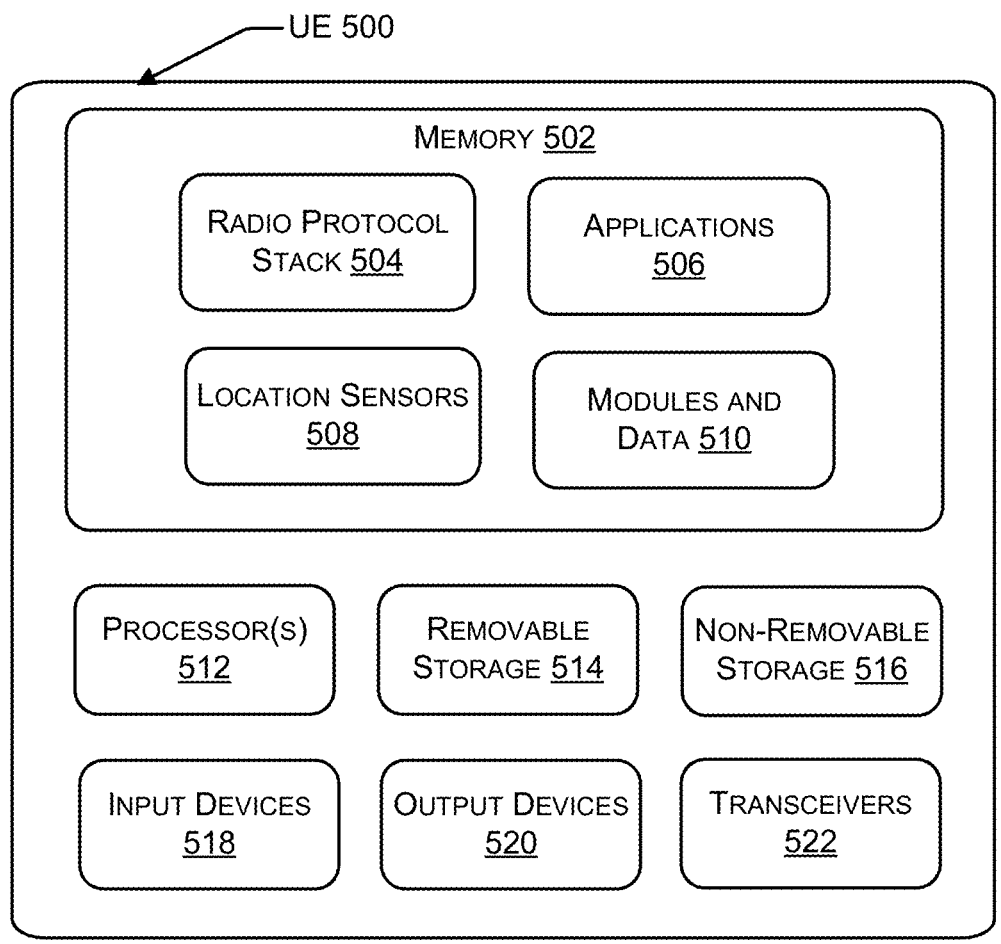
FIG. 5 illustrates an example architecture of a computing device of a UE configured to provide indicia to a RAN and to receive, in return, an allocation of transmission slots.

UEs 106, including UE 106a and UE 106b, are located within cell 104; FIG. 1 shows UE 106a and UE 106b at different locations within cell 104. In various implementations, each UE 106 may be any sort of wireless communication device, such as a cellular handset, a tablet computer, a personal computer, a desktop computing device, a media player, etc. Each UE 106 may include one or more radios for wireless communication and/or wired port(s), may include both input and output components, and may have a Subscriber Identity Module (SIM) or other technology that securely stores identity information for the UE 106. Further, each UE 106 may include a radio protocol stack, applications, and location sensors. An example UE 106 is illustrated in FIG. 5 and described further herein with reference to that figure.

In some implementations, each of UE 106a and UE 106b have uplink communications, downlink communications, or both to engage in. Such communications may be connected to applications of the UEs 106 or to their platforms. For example, communications may include voice calling, video calling, text messaging, multimedia messaging, conferencing, streaming media, browsing of network content, participation in social media, participation in online games, etc. Different ones of these communications may require more downlink bandwidth or more uplink bandwidth. Also, different locations in the cell 104 may be associated with greater needs for downlink or uplink due to characteristics of the associated cellular technology or due to geographic features (hills, buildings, etc.).

Upon any change in conditions—such as location of the UE 106, change in the application executing on the UE 106, or change in RAN conditions, such as signal strength, signal quality, packet loss, or RAN load, the UE 106 may provide indicia to the RAN 102. Such indicia may represent only values that have changed or may represent a list of values determined by a configuration of the UE 106. Responsive to determining a change in any of the conditions mentioned above (or other conditions), a Packet Data Control Protocol (PDCP) layer of the radio protocol stack of the UE 106 may measure or otherwise determine the values to include in the indicia. The indicia may then be provided to the RAN 102 via the Radio Link Control (RLC) layer of the radio protocol stack. Such indicia may include RAN conditions signal strength, signal quality, packet loss, or RAN load, or other information about the UE 106, such as location, active applications, etc. In some implementations, the location may be determined by a location sensor of the UE 106. Additionally, the indicia may include desired allocations of uplink or downlink, these being specified by applications or by the radio protocol stack. FIG. 1 illustrates two examples of indicia: indicia 108, transmitted to the RAN 102 by UE 106a, and indicia 112 transmitted to the RAN 102 by 106b. As shown, each of indicia 108 and 112 may reflect different locations and different RAN conditions.

Upon receiving indicia from any UE 106, the scheduler of the RAN 102 may determine an allocation of uplink transmission slots and downlink transmission slots for that UE 106. In determining allocations, the scheduler considers a number of factors. For example, the scheduler looks at RAN conditions and UE information in the received indicia and in indicia received from other UEs 106 within the cell 104 (e.g., indicia received within some previous time period). In one example, the scheduler may note that two UEs 106 are each streaming video, but that one UE 106 is at the cell edge while the other is close to the cell tower. Given these different locations and the applications used, the scheduler may assign a greater proportion of downlink slots to both, but if availability of downlink is limited, the scheduler may give a greater ratio of downlink slots to the UE 106 at the cell edge.

The scheduler may also consider both outer boundary ratios and downlink buffers when allocating transmission slots. For example, downlink may be bounded at ninety percent of total slots. So for every ten slots, no more than nine may be download. A similar boundary ratio may apply for uplink. Even when the indicia would lead the scheduler to heavily weigh assignment of transmission slots to one of downlink or uplink, the boundary ratios limit its ability to do so.

In various implementations, the scheduler of the RAN 102 may also be constrained by configuration received by SON 122 and/or by requirements to obtain approval from the telecommunications network. Such approval may be handled by an internetworking module of the RAN 102, which may obtain a proposed allocation of uplink transmission slots and downlink transmission slots from the scheduler, provide the proposed allocations to a telecommunications network service implemented, e.g., in the core network 116 of the telecommunications network, and obtain approval or disapproval in response. Alternatively, the internetworking module may contact adjacent cells of other telecommunication networks 120 via the X2 interface to exchange proposed allocations. The result of the exchange may then be evaluated based on a configuration received from the SON 122.

Whether constrained by configuration or by direct approval from a telecommunications network service, the constraints may reflect negotiation 118 between telecommunications network providers. Devices of the core network 116 and other telecommunications network 120 may propagate results of the negotiations 118. For example, results of the negotiations 118 may be provided to SON 122 and used to update a configuration for the RAN 102. Additionally or alternatively, results of the negotiations 118 may be used to respond to requests for approval of allocations from RANs, such as RAN 102.

The telecommunications network providers may determine times at which greater downlink or uplink allocations may be made at different frequency bands and at different locations. They may also define circumstances in which RANs are to fall back to making default allocations (e.g., 3 downlink slots to every 1 uplink slot) or to following a set of allocation patterns at different times, in different locations, or under different conditions. The results of these negotiations 118, including defaults and patterns, are then used as configurations and/or approval criteria in the manner described above.

In various implementations, the SON 122 may be a management plane for receiving performance information from RANs and updating configurations of those RANs in response. In the context of FIG. 1, the SON 122 may receive some or all of the information provided in indicia 108 and 112, as well as other information tracked by the RAN 102 (e.g., downlink buffer sizes), and, in some examples, configuration information related to negotiations 118. Based on such received information, the SON 122 may generate an updated configuration for RAN 102 and provide the updated configuration to RAN 102 via the configuration module of the RAN 102.

After the scheduler of the RAN 102 has taken into account received information, configuration, and any needed approvals, the allocation 110 for UE 106*a* and allocation 114 for UE 106*b* may be provided to those UEs 106. As shown in FIG. 1, the allocation 110 may differ from allocation 114, whether because of different transmission needs or because of limitations or constraints on either uplink or downlink. Each UE 106 may then utilize the allocated slots in transmitting and receiving communications, as described above.

In some implementations, as noted above, a UE 106 may repeat the determining and providing of indicia and receiving of allocations of transmission slots in response to moving to another location or actively using a different application. These movements or use changes may result in different indicia and, possibly, different allocations. In various implementations, however, the changes may lead to different indicia but not to different allocations. For example, when the RAN 102 is using a default allocation or allocation pattern, changes in the factors measured by the indicia may not lead to changes in allocation. Rather, indicia may not effect allocations, or may only effect a choice between a small, limited set of options. In such examples, RAN 102 may configure the UE 106 to either suspend providing of indicia or to provide a smaller subset.

Example Operations

Figure 2:
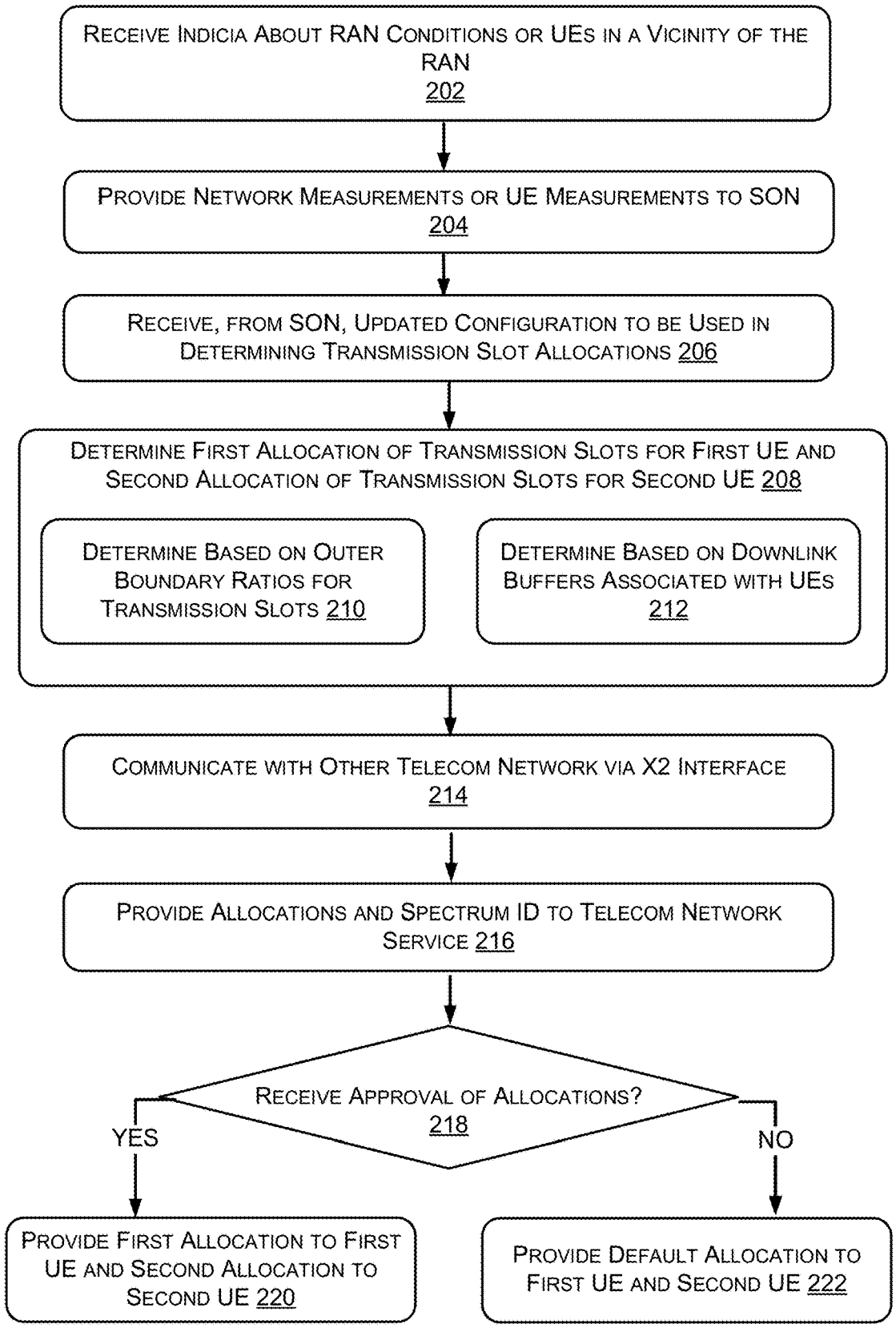
FIG. 2 illustrates a flow chart of an example process for receiving indicia from UEs, determining allocations of transmission slots to UEs, and providing those allocations.
Figure 3:
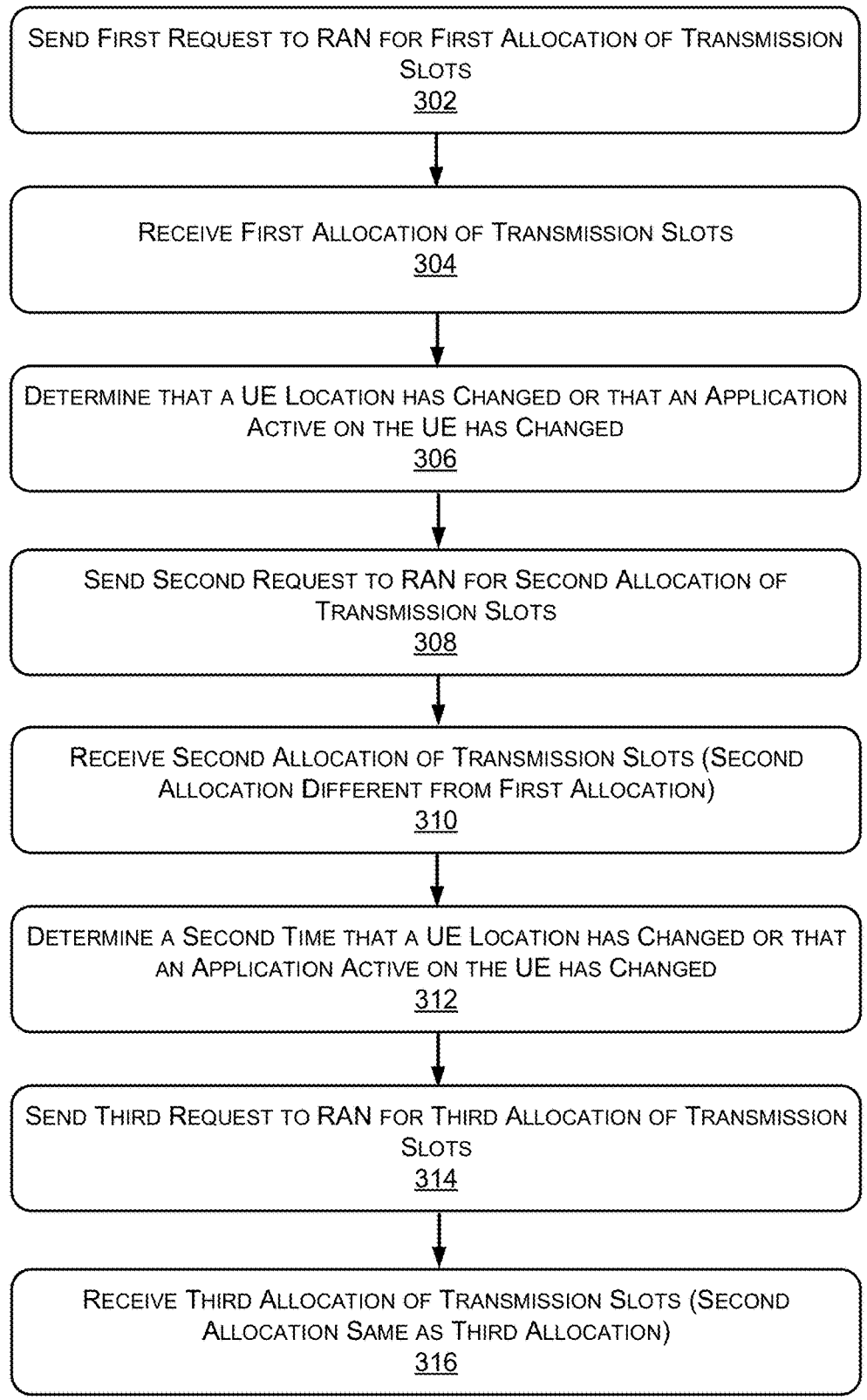
FIG. 3 illustrates a flow chart of an example process for providing indicia to a RAN and receiving in return an allocation of transmission slots.

FIGS. 2-3 illustrate example processes. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIG. 2 illustrates a flow chart of an example process for receiving indicia from UEs, determining allocations of transmission slots to UEs, and providing those allocations. As illustrated at 202, a RAN device may receive indicia about RAN conditions or about UEs in a vicinity of the RAN. In some implementations, the RAN conditions may include at least one of signal strength, signal quality, packet loss, or RAN load and the indicia about the UEs in the vicinity of the RAN may include locations of the UEs, applications active on the UEs, or a desired allocation ratio of uplink transmission slots to downlink transmission slots.

At 204, the RAN device may provide one or more network measurements or UE measurements to a SON and, at 206, may receive, from the SON, an updated configuration to be utilized by the RAN device in determining allocations of transmission slots. Though illustrated between the operations shown at 202 and at 208, operations 204-206 may occur at any point in the process(es) illustrated in FIG. 2.

At 208, the RAN device may then determine, based at least in part on the indicia, a first allocation of uplink and downlink transmission slots to a first UE and a second allocation of uplink and downlink transmission slots to a second UE. In some implementations, the first allocation may differ from the second allocation. At 210, the determining may include determining the first allocation and the second allocation based at least in part on outer boundary ratios for allocation of uplink transmission slots and downlink transmission slots. At 212, the determining may further be based at least in part on downlink buffer(s) associated with the UE. Also, in some implementations, the first UE and the second UE may be engaged in similar activities but may be at different relative locations within a cell associated with the RAN.

At 214, the RAN device may then communicate with a device of another telecommunication network via an X2 interface, providing, at 216, the first allocation and the second allocation and a spectrum identification to a telecommunication network service. At 218, the RAN device then receives, in response, approval or disapproval of the first allocation and the second allocation.

If receiving approval, the RAN device may then provide, at 220, the first allocation to the first UE and the second allocation to the second UE. If, on the other hand, disapproval is received, the RAN device may instead provide, at 222, a default allocation to the first UE and the second UE. In some implementations, the default allocation may be based at least in part on the first allocation, the second allocation, and allocation(s) provided by other RANs.

FIG. 3 illustrates a flow chart of an example process for providing indicia to a RAN and receiving in return an allocation of transmission slots. As illustrated, at 302, a UE may send a first request for a first allocation of uplink transmission slots and downlink transmission slots from a RAN. The request may include indicia about RAN conditions or about the UE. For example, the RAN conditions may include at least one of signal strength, signal quality, packet loss, or RAN load and the indicia about the UE may include a location of the UE, an application active on the UE, or a desired allocation ratio of uplink transmission slots to downlink transmission slots. In some implementations, the indicia are determined at a PDCP layer of the UE and communicated by a RLC layer of the UE. At 304, the UE may then receive, in return, the first allocation of uplink transmission slots and downlink transmission slots.

At 306, the UE may determine that a location of the UE has changed or that an application active on the UE has changed. Responsive to the determining, the UE may send, at 308, a second request for a second allocation of uplink transmission slots and downlink transmission slots from the RAN. At 310, the UE may then receive, from the RAN, the second allocation of uplink transmission slots and downlink transmission slots. In various implementations, the first allocation of uplink transmission slots and downlink transmission slots may differ from the second allocation of uplink transmission slots and downlink transmission slots.

At 312, the UE may determine a second time that the location of the UE has changed or that the application active on the UE has changed. Responsive to the determining, the UE may send, at 314, a third request for a third allocation of uplink transmission slots and downlink transmission slots from the RAN. At 316, the UE may then receive, from the RAN, the third allocation of uplink transmission slots and downlink transmission slots. In various implementations, third allocation of uplink transmission slots and downlink transmission slots may be the same as the second allocation of uplink transmission slots and downlink transmission slots.

Example Architectures

FIG. 4 illustrates an example architecture of a computing device of a RAN configured to receive indicia from a UE and to provide, in return, an allocation of transmission slots to the UE. The RAN may be an example of a RAN 102, which is described further herein. The RAN device 400 can have a system memory 402. The system memory 402 can store a scheduler 404, a configuration module 406, an internetworking module 408, downlink buffers 410, and/or other modules and data 412. The computing device 400 can also include processor(s) 414, removable storage 416, non-removable storage 418, input device(s) 420, output device(s) 422, and transceiver(s) 424.

In various examples, system memory 402 can be volatile (such as random-access memory (RAM)), non-volatile (such as read-only memory (ROM), flash memory, etc.), or some combination of the two. Example system memory 402 can include one or more of RAM, ROM, electronically erasable programmable ROM (EEPROM), a Flash Memory, a hard drive, a memory card, an optical storage, a magnetic cassette, a magnetic tape, a magnetic disk storage or another magnetic storage devices, or any other medium.

Examples of the scheduler 404, configuration module 406, internetworking module 408, and downlink buffers 410 are described above in detail with reference to FIG. 1.

The other modules and data 412 can be utilized by the computing device 400 to perform or enable performing any action taken by the computing device 400. The other modules and data 412 can include a platform and applications, and data utilized by the platform and applications.

In some embodiments, the processor(s) 414 can be a central processing unit (CPU), a graphics processing unit (GPU), both CPU and GPU, or other processing unit or component known in the art.

The computing device 400 can also include additional data storage devices (removable and/or non-removable) such as, for example, magnetic disks, optical disks, or tape. Such additional storage is illustrated in FIG. 4 by removable storage 416 and non-removable storage 418. Non-transitory computer-readable media may include volatile and nonvolatile, removable and non-removable media implemented in any method or technology for storage of information, such as computer readable instructions, data structures, program modules, or other data. System memory 402, removable storage 416 and non-removable storage 418 are all examples of non-transitory computer-readable media. Non-transitory computer-readable media include, but are not limited to, RAM, ROM, EEPROM, flash memory or other memory technology, compact disc-ROM (CD-ROM), digital versatile discs (DVD) or other optical storage, magnetic cassettes, magnetic tape, magnetic disk storage or other magnetic storage devices, or any other medium which can be used to store the desired information and which can be accessed by the computing device 400. Any such computer-readable storage media can be part of the computing device 400. In various examples, any or all of system memory 402, removable storage 416, and non-removable storage 418, store programming instructions which, when executed, implement some or all of the above-described operations of the computing device 400.

In some examples, the computing device 400 can also have input device(s) 420, such as a keyboard, a mouse, a touch-sensitive display, voice input device, etc., and/or output device(s) 422 such as a display, speakers, a printer, etc. These devices are well known in the art and need not be discussed at length here.

The computing device 400 can also include one or more transceivers, such as a New Radio (NR) transceiver or a Long-Term Evolution (LTE) transceiver to facilitate communication with other devices, such as one or more UEs 106.

FIG. 5 illustrates an example architecture of a computing device of a UE configured to provide indicia to a RAN and to receive, in return, an allocation of transmission slots. The UE 500 may be an example of a UE 106, which is described further herein. The UE 500 can have a system memory 502. The system memory 502 can store a radio protocol stack 504, application(s) 506, location sensor(s) 508, and/or other modules and data 510. The UE 500 can also include processor(s) 512, removable storage 514, non-removable storage 516, input device(s) 518, output device(s) 520, and transceiver(s) 522.

In various examples, system memory 502 can be volatile (such as random-access memory (RAM)), non-volatile (such as read-only memory (ROM), flash memory, etc.), or some combination of the two. Example system memory 502 can include one or more of RAM, ROM, electronically erasable programmable ROM (EEPROM), a Flash Memory, a hard drive, a memory card, an optical storage, a magnetic cassette, a magnetic tape, a magnetic disk storage or another magnetic storage devices, or any other medium.

Examples of the radio protocol stack 504, application(s) 506, and location sensor(s) 508 are described above in detail with reference to FIG. 1.

The other modules and data 510 can be utilized by the computing device 500 to perform or enable performing any action taken by the computing device 500. The other modules and data 510 can include a platform and applications, and data utilized by the platform and applications.

In some embodiments, the processor(s) 512 can be a central processing unit (CPU), a graphics processing unit (GPU), both CPU and GPU, or other processing unit or component known in the art.

The UE 500 can also include additional data storage devices (removable and/or non-removable) such as, for example, magnetic disks, optical disks, or tape. Such additional storage is illustrated in FIG. 5 by removable storage 514 and non-removable storage 516. Non-transitory computer-readable media may include volatile and nonvolatile, removable and non-removable media implemented in any method or technology for storage of information, such as computer readable instructions, data structures, program modules, or other data. System memory 502, removable storage 514 and non-removable storage 516 are all examples of non-transitory computer-readable media. Non-transitory computer-readable media include, but are not limited to, RAM, ROM, EEPROM, flash memory or other memory technology, compact disc-ROM (CD-ROM), digital versatile discs (DVD) or other optical storage, magnetic cassettes, magnetic tape, magnetic disk storage or other magnetic storage devices, or any other medium which can be used to store the desired information and which can be accessed by the UE 500. Any such computer-readable storage media can be part of the UE 500. In various examples, any or all of system memory 502, removable storage 514, and non-removable storage 516, store programming instructions which, when executed, implement some or all of the above-described operations of the UE 500.

In some examples, the UE 500 can also have input device(s) 518, such as a touch-sensitive display, voice input device, etc., and/or output device(s) 520 such as a display, speakers, etc. These devices are well known in the art and need not be discussed at length here.

The UE 500 can also include one or more transceivers 522, such as an NR transceiver or an LTE transceiver to facilitate communication with other devices, such as a RAN 102.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method comprising:
   receiving, by a radio area network (RAN) device associated with a RAN, indicia about RAN conditions or about user equipment (UE) in a vicinity of the RAN;
   determining, by the RAN device, based at least in part on the indicia, a first allocation of uplink and downlink transmission slots to a first UE and a second allocation of uplink and downlink transmission slots to a second UE, wherein the first allocation differs from the second allocation;
   providing one or more network measurements or UE measurements to a Self-Optimizing Network (SON);
   receiving, from the SON, an updated configuration to be utilized by the RAN device in determining the first allocation and the second allocation; and
   providing, by the RAN device, the first allocation to the first UE and the second allocation to the second UE.

2. The method of claim 1, further comprising instead of providing the first allocation to the first UE and the second allocation to the second UE, providing a default allocation to the first UE and the second UE.

3. The method of claim 2, wherein the default allocation is based at least in part on the first allocation, the second allocation, and allocations provided by other RANs.

4. The method of claim 1, wherein the RAN conditions include at least one of signal strength, signal quality, packet loss, or RAN load and the indicia about the UE in the vicinity of the RAN includes locations of the UE, applications active on the UE, or a desired allocation ratio of uplink transmission slots to downlink transmission slots.

5. The method of claim 1, wherein determining the first allocation and the second allocation is further based at least in part on downlink buffers associated with the UE.

6. The method of claim 1, wherein the first UE and the second UE are engaged in similar activities but are at different relative locations within a cell associated with the RAN.

7. The method of claim 1, further comprising communicating with a device of another telecommunication network via an X2 interface.

8. A Radio Access Network (RAN) comprising:
   a processor;
   a transceiver coupled to the processor; and
   a scheduler executed by the processor to perform operations including:
   receiving indicia about RAN conditions or about user equipment (UE) in a vicinity of the RAN;
   determining based at least in part on the indicia, a first allocation of uplink and downlink transmission slots to a first UE and a second allocation of uplink and downlink transmission slots to a second UE, wherein the first allocation differs from the second allocation and determining the first allocation and the second allocation is based at least in part on downlink buffers associated with the UE; and
   providing the first allocation to the first UE and the second allocation to the second UE.

9. The RAN of claim 8, further comprising:
   providing one or more network measurements or UE measurements to a Self-Optimizing Network (SON); and
   receiving, from the SON, an updated configuration to be utilized by a RAN device in determining the first allocation and the second allocation.

10. The RAN of claim 8, wherein the operations further include instead of providing the first allocation to the first UE and the second allocation to the second UE, providing a default allocation to the first UE and the second UE.

11. The RAN of claim 10, wherein the default allocation is based at least in part on the first allocation, the second allocation, and allocations provided by other RANs.

12. The RAN of claim 8, wherein the RAN conditions include at least one of signal strength, signal quality, packet loss, or RAN load and the indicia about the UE in the vicinity of the RAN includes locations of the UE, applications active on the UE, or a desired allocation ratio of uplink transmission slots to downlink transmission slots.

13. A non-transitory computer-readable medium having stored thereon executable instructions for programming a user equipment (UE) to perform operations comprising:
   sending a first request for a first allocation of uplink transmission slots and downlink transmission slots from a radio access network (RAN);
   receiving, from the RAN, the first allocation of uplink transmission slots and downlink transmission slots;
   determining that a location of the UE has changed or that an application active on the UE has changed;
   responsive to the determining, sending a second request for a second allocation of uplink transmission slots and downlink transmission slots from the RAN;
   receiving, from the RAN, the second allocation of uplink transmission slots and downlink transmission slots; and
   receiving, from the RAN, a default allocation, the default allocation being based at least in part on the first allocation and the second allocation.

14. The non-transitory computer-readable medium of claim 13, wherein the first allocation of uplink transmission slots and downlink transmission slots differs from the second allocation of uplink transmission slots and downlink transmission slots.

15. The non-transitory computer-readable medium of claim 13, wherein the request including indicia about RAN conditions or about the UE.

16. The non-transitory computer-readable medium of claim 15, wherein the indicia are determined at a packet data control protocol (PDCP) layer of the UE and communicated by a radio link control (RLC) layer of the UE.

17. The non-transitory computer-readable medium of claim 15, wherein the RAN conditions include at least one of signal strength, signal quality, packet loss, or RAN load and the indicia about the UE include a location of the UE, an application active on the UE, or a desired allocation ratio of uplink transmission slots to downlink transmission slots.

18. The non-transitory computer-readable medium of claim 13, wherein the operations further comprise:
determining a second time that the location of the UE has changed or that the application active on the UE has changed;
responsive to determining the second time, sending a third request for a third allocation of uplink transmission slots and downlink transmission slots from the RAN; and
receiving, from the RAN, the third allocation of uplink transmission slots and downlink transmission slots, wherein the third allocation of uplink transmission slots and downlink transmission slots is the same as the second allocation of uplink transmission slots and downlink transmission slots.

19. The non-transitory computer-readable medium of claim 13, wherein the default allocation is further determined based at least in part on allocations provided by other RANs.

20. The non-transitory computer-readable medium of claim 13, wherein the operations further comprise providing one or more UE measurements to at least one of the RAN or a Self-Optimizing Network (SON).

\* \* \* \* \*